June 20, 1950     D. M. ANDRIST     2,511,828
BAITING MACHINE

Filed Feb. 12, 1948     4 Sheets-Sheet 1

INVENTOR
D. M. Andrist
BY
ATTORNEYS

June 20, 1950 D. M. ANDRIST 2,511,828
BAITING MACHINE

Filed Feb. 12, 1948 4 Sheets-Sheet 2

INVENTOR
D. M. Andrist
BY
Glascock Downing Riehle
ATTORNEYS

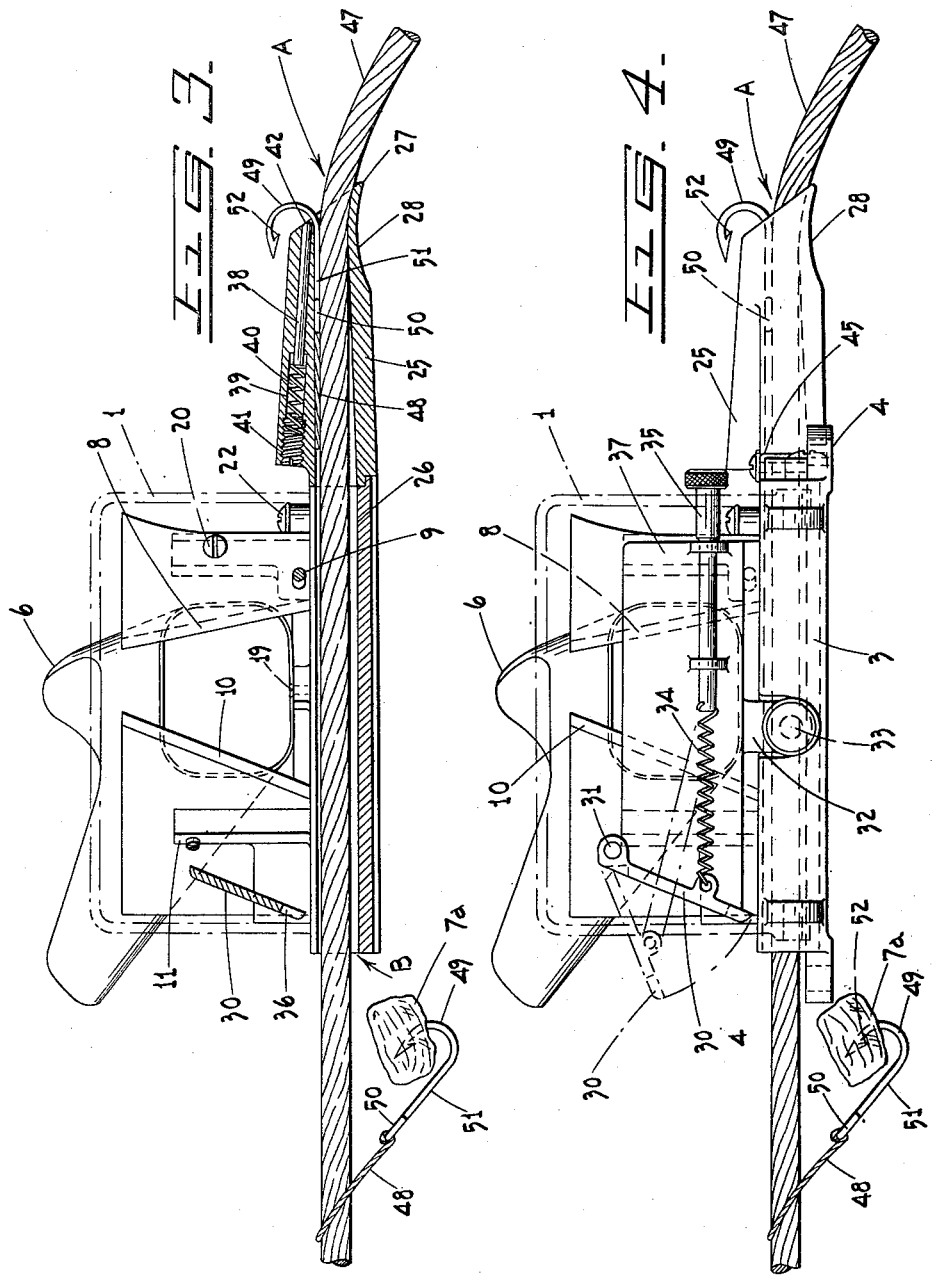

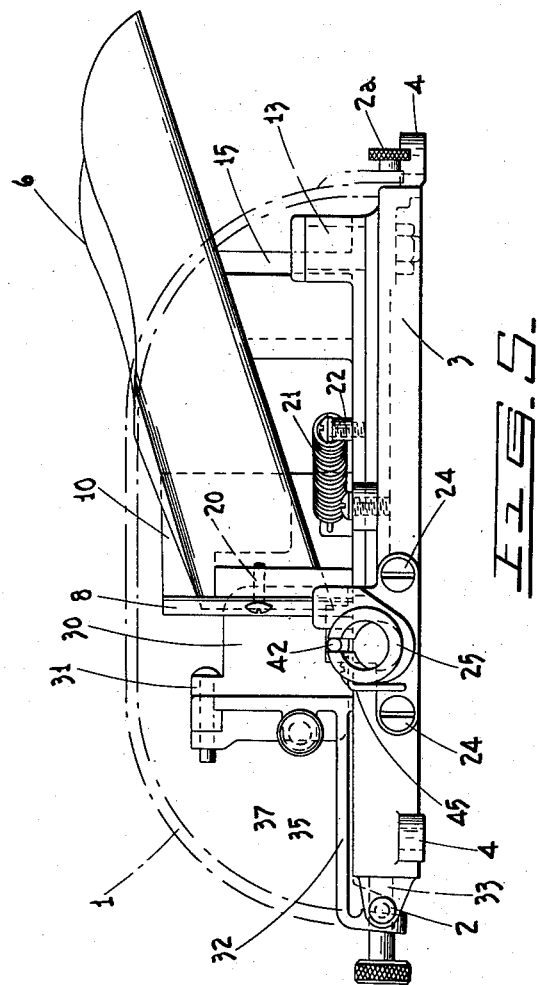

Patented June 20, 1950

2,511,828

UNITED STATES PATENT OFFICE

2,511,828

BAITING MACHINE

David Minor Andrist, Victoria, British Columbia, Canada, assignor to Andhop Patents Limited, Victoria, British Columbia, Canada, a corporation of British Columbia Application February 12, 1948, Serial No. 7,829

16 Claims. (Cl. 43—4)

The present invention relates to baiting machines, and particularly to baiting machines of the kind described in my prior application, Serial No. 737,175, filed on March 25th, 1947.

It is an object of the present invention to provide a baiting machine that may be used to bait a line of considerable length having a large number of hooks attached at spaced intervals.

Another object of the invention is the providing of a baiting machine that will automatically cut the bait to be placed on the hooks thereby rendering it unnecessary for the bait to be cut by hand.

A further object of the invention is the providing of a baiting machine that will automatically bait the hooks on a line as it is reeled out from a moving boat.

Additional objects and advantages of the invention will be set out below.

In the past, particularly in connection with deep-sea fishing, it has been customary to bait the hooks by hand. Fish, usually herring, are used for bait and are cut up into pieces by hand. The line, with free hooks attached along its length at intervals, is unwound from a reel or drum located towards the rear of a boat; a section of bait is secured to each hook in turn and the baited line is let down into the water. This practice is slow, tedious and has proven to be dangerous on many occasions. The use of the present invention will eliminate the hazards, speed up the baiting process and may revolutionize the fishing industry.

The invention consists in the construction, combination and arrangement of parts hereinafter described and more particularly pointed out in the appended claims.

One convenient embodiment of the invention will now be described by way of example with reference to the drawings in which:

Figure 3 is an elevation in section on the line 3—3 of Figure 1.

Figure 4 is an elevation looking on the side of the machine appearing at the bottom of Figure 2.

Figure 5 is a front elevation with cover indicated in chain-dotted lines.

Figure 1:
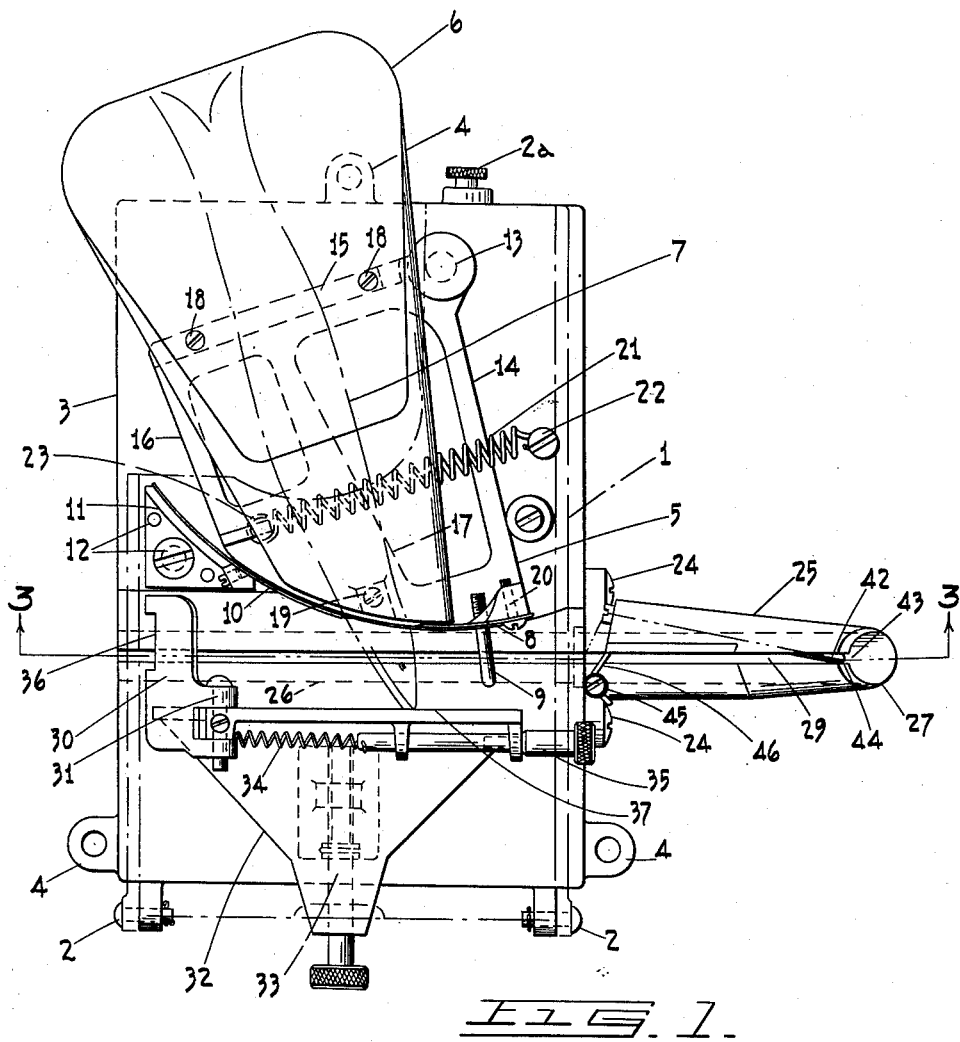
Figure 1 is a plan view of complete machine with the cover removed.

The baiting machine comprises a cover 1, of convenient shape detachably secured by screws 2 and 2a to a main base or frame 3 which may be attached to the boat by means of screws or bolts (not shown) passing through holes in lugs 4. A bait-severing means comprising a movable frame 5 supporting a funnel feeder or bait-containing means 6, containing the bait or fish indicated in dotted lines at 7, a knife blade 8 and a pin or hook-engaging means 9. A fixed knife blade 10 is attached to a bracket 11 secured to the main frame 3 by suitable means such as screws 12. The movable frame 5 is pivoted at 13 and consists of members 14, 15, 16, and 17. The funnel feeder 6 is attached to members 15 and 17, by means of screws 18 and 19 respectively. The knife blade 8 is attached to the movable frame at the juncture of member 14 and 17 by means of a set-screw 20. A tension spring 21, fastened to the main frame at 22 and attached to the movable frame at 23, returns the frame 5 to its original position after the cutting operation has been completed.

Secured to the main frame 3 by means of bolts 24 is a tube or line-directing means 25 which extends through the frame 3 as shown at 26. The entrance to the line-directing means is bevelled and pointed on the underside to form a hook-positioning means 27. It is preferable that the hook-positioning means be bevelled and of more or less circular shape and that it be curved or hollowed on the underside as shown at 28. The remainder of the tube may be circular, square or of any convenient shape.

A narrow slot or hook-guiding means 29 extends the full length of the tube 25—26. The small pin 9 or hook engaging means attached to the movable frame 5 extends across the aperture 29. In the normal position, shown in Figure 1, the pin 9 is substantially at right angles to the slot 29.

A frame 32 adjustably connected to the main frame 3 by screw 33 has a wall or bait-retaining means 37 directly opposite the funnel feeder 6. Adjacent the exit end of the tube 25 is a small hanging door or flap 30 hinged at 31 to the frame 32. The flap is provided with a tension spring 34 which may be adjusted by screw 35 and through the spring exerts sufficient pressure on the bait to force the hook to become firmly embedded in the bait as it is pulled through an opening 36 on the underside of the flap.

At a point close to the entrance of the tube 25, and adjacent the hook-guiding slot 29 may be provided hook-retaining means housed within one wall of the tube 25 and comprising a plunger 38 normally pressed outwardly by means of a compression spring 39, contained in a short tube or housing 40, one end of which is closed by means of a screw 41, which may be turned to adjust the compression of the spring or removed to insert a new spring. The free end 42 of the plunger 38 normally projects into and completely bridges the entrance 43 of the aperture 29 (see Figure 1). The angle made by the plunger 38 with the wall of the slot 29 at the entrance thereof must be less than a right angle and such that the hooks will not fail to depress the plunger 38. The free end 42 of the plunger must be round so that the hooks will not become wedged between the end of the plunger and the wall of the slot 29 at the point 44 and thereby fail to depress the plunger. A coil spring 45, having a projecting end 46 which extends across the slot 29, may be employed to prevent the hook from springing out of the slot 29. The member 46 is pulled forward by the hooks and is returned automatically to its normal position by the coil spring 45.

Shown in Figures 3 and 4 is a length of fishing-line 47. Short lines 48 are attached at intervals along line 47, a hook 49 being attached to the end of each short line. Each hook has an eye 50, a shank 51 and a barb 52.

In operation the fishing-line 47, which may be of any required weight, is pulled from a drum or reel (not shown) and fed into the tube 25 at A and emerges from tube 25 at B. The free end of the line is then attached to a float and anchor and dropped into the water. As the boat moves forward the line unwinds from the drum and the hooks 49 in turn are drawn through the automatic baiting machine. As the hooks approach the machine they are hanging by means of the short lines 48 from the line 47 but due to the bevelled and pointed construction of the hook-positioning means 27 at the end of the tube 25 they are pulled into upright position and then move forwardly and upwardly at the same time. In order to prevent the hook from becoming caught on the bottom of the tube, the bottom is slightly hollowed as shown at 28. The hook enters the slot 29 at 43, and lies in a more or less vertical plane at this point. Any tendency on the part of the shot lines 48 or the hooks themselves to ride up out of the tube 25 through the slot 29 is prevented by the end 42 of the plunger 38 comprising part of the hook-retaining means. That is, when the hook reaches the entrance 43 it acts against the end 42 of the plunger 38 which is forced back against the spring 39 thus momentarily freeing the entrance and permitting the hook to proceed with its barbed end 52 riding above the tube 25. Immediately the hook has passed into the tube the spring 39 forces the plunger 38 back into normal position where it remains until acted on by another hook.

As the hook passes along the slot 29 the shank 51 passes under the member 46 of the coil spring 45, the member 46 preventing the hook from jumping up out of the tube or out of position. The curved part of the hook catches and pulls the member 46 forward until the hook slides by the member which is then returned to its original position by means of the coil spring 45.

Figure 2:
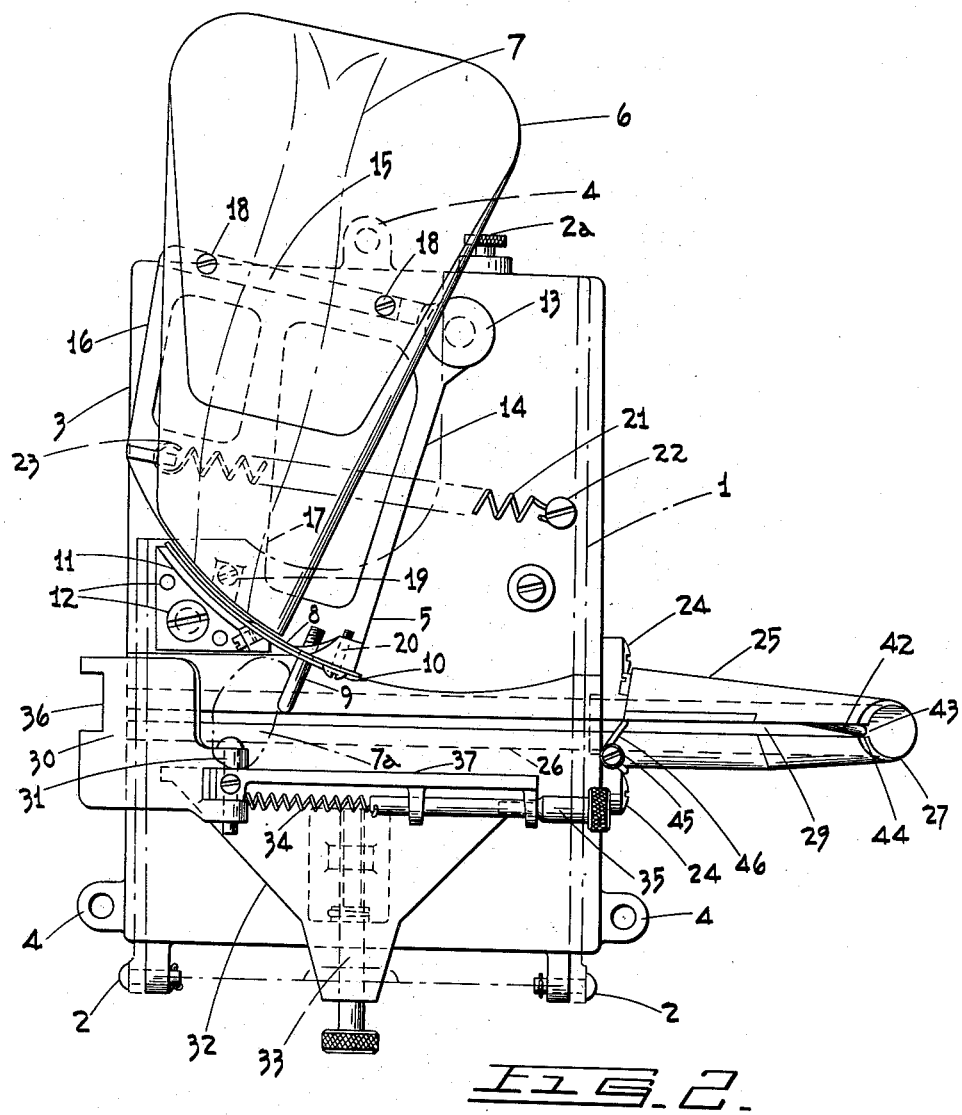
Figure 2 is a plan view similar to that shown in Figure 1, but with the cutting means shown at the completion of the stroke.

As the hook passes further along the slot 29 it engages the pin 9 and proceeds to swing the bait holder 6 on its pivot 13. This action causes the knife blade 8 and the fish or bait 7 to move forward towards the fixed knife blade 10. The knife-blades 8 and 10 act as shears and cooperate to cut off a piece of fish. The cutting edges of the blades 8 and 10 are preferably arranged at an angle with respect to each other as will be seen in Figures 3 and 4. Just as the piece of bait 7a is severed from the main section of bait 7 the pin 9 swings to the side of the slot 29 out of the path of the hook (Figure 2). The hook continues to advance, thus releasing the pin 9 so that the spring 21 returns the bait holder 6 to its normal position (Figure 1). In other words the tip of the hook-engaging means 9 describes an arc in moving through the bait-severing operation and the hook-guiding means 29 is a chord of the arc. As the hook-engaging means describes the arc, the movable knife-blade 8 is pulled forward and the bait-severing operation is completed at the point where the arc intersects the chord.

The hook and the line, being no longer encumbered with the weight of the movable knife-blade 8, move or dart rapidly forward for a short distance and the hook in so moving comes into contact with the severed piece of bait lying across the slot 29 and pierces it. The bait, with the hook partially engaged therewith, is pulled against the small hanging door 30 and while the door is being forced open, its weight, plus the pull of the spring 34 is sufficient to embed the hook securely within the piece of bait. As soon as the bait-cutting operation is completed the remaining piece of bait in the funnel 6 slides down the funnel until the lower part of the bait comes into contact with the wall 37 and is then in position to be engaged by the next hook. By moving the frame 32 by means of the screw 33, the wall 37 can be brought closer to or further from the slot 29, thereby decreasing or increasing the size of the piece of bait severed by the knife-blades.

It should be understood that machines may be provided with either a right and left hand cutting attachment and feed in order to accommodate the needs of the operator. The machine may also be manufactured in any desired size in order to accommodate hooks of various sizes. However, any one machine will operate with hooks of different sizes, as long as the diameter of the hooks is not smaller than the diameter of the line-retaining tube. If the hooks are smaller than the tube or line-retaining tube they may be drawn down into the tube and thus would not come into contact with the pin 9 attached to the knife blade 8, and thus some of the hooks would not be baited.

Furthermore, the width of the hook-guiding slot 29 must never be greater and is preferably less than the outside diameter of the eye 50 on hook 49, otherwise the hook may emerge from the hook-guiding means and fail to engage with the bait-cutting means.

The line directing means may also be hinged so as to permit the hook-guiding slot to be opened to permit the line to be placed therein instead of being threaded through.

It will be evident from the foregoing that the present invention provides a baiting machine which is of simple construction, efficient in operation and which will save valuable time for the fisherman.

It should be understood that the description presented above is intended to be of the nature of an example only. Modifications to any degree may be made within the scope of the appended claims.

What is claimed is:

1. Apparatus for use in baiting a fishing line and in particular a fishing line having a plurality of hooks secured thereto at spaced intervals, said apparatus comprising in combination hook-guiding means and bait-severing means adjacent said hook-guiding means and operable by means of said hooks on said line.

2. Apparatus for use in baiting a fishing-line and in particular a fishing-line having a plurality of hooks secured thereto at spaced intervals, said apparatus having hook-guiding means in combination with line-directing means, bait-supplying means in combination with bait-severing means, said bait-severing means being adjacent said line-directing means and being operable by means of said hooks on said line.

3. Apparatus for use in baiting a fishing-line and in particular a fishing-line having a plurality of hooks secured thereto at spaced intervals, said apparatus comprising hook-guiding means in combination with line-directing means, hook-positioning means, hook-retaining means, bait-containing means, bait-retaining means and bait severing means, said bait-severing means being operable by means of said hooks on said line; and bait-securing means.

4. Apparatus according to claim 3 wherein said bait-retaining means and bait-severing means are oppositely situated one on either side of said hook-guiding means.

5. Apparatus according to claim 3 comprising in addition a moveable frame and wherein said bait-severing means comprises a movable section and a stationary section, each section having a cutting blade secured thereto.

6. Apparatus according to claim 5 wherein one of said cutting blades is movable along an arcuate path into shearing cooperation with the other blade.

7. Apparatus according to claim 5 wherein said bait-containing means and the movable section of said bait-severing means are secured to and movable with the said movable frame.

8. Apparatus according to claim 7 wherein said movable section of said bait-severing means has secured thereto and projecting therefrom hook-engaging means whereby said movable frame, said bait-containing means and said movable section of said bait-severing means may be moved into and through an automatic bait-severing operation each time a hook engages said hook-engaging means, said hook-engaging means having a free end.

9. Apparatus according to claim 8 wherein said hook-engaging means normally projects at a considerable angle to and across the line-directing means and the hook-guiding means and assumes a hook-obstructing position adjacent said hook-positioning means thereby obstructing the free passage of the hooks along said hook-guiding means, one of said hooks in traversing said hook-guiding means becoming engaged with and acting through said hook-engaging means and thereby transporting said movable section of said bait-severing means into and through a bait-severing operation, said hook and said hook-engaging means becoming disengaged at the point at which said bait-severing operation has been completed.

10. Apparatus according to claim 9 wherein the said free end of said hook-engaging means describes an arc in moving through said bait-severing operation, the axis of said hook-guiding means being disposed as a chord of said arc, and the point of intersection of said arc and said chord immediately preceding the point at which the bait-severing operation is completed.

11. A hook baiting apparatus comprising a tube through which may pass a fishing line bearing hooks at intervals, the top of said tube having a longitudinal slot formed therein, means for positioning the hooks in succession with respect to said tube so that the barbs of the hooks may project upwardly through the said longitudinal slot, and bait feeding and severing means arranged to feed a supply of bait into the path of each hook and automatically sever a piece of bait as each hook passes through said tube.

12. Apparatus as claimed in claim 11 wherein spring means are provided for returning said bait feeding and severing means to normal position after each severing operation.

13. Apparatus as claimed in claim 11 wherein a hinged door is provided normally lying in the path of the hooks adjacent the exit end of said tube and spring means urging said door towards its normal position.

14. Apparatus as claimed in claim 11 wherein an adjustable frame, having secured thereto a bait-retaining wall is provided directly opposite said bait feeding means.

15. Appartus as claimed in claim 14 wherein said adjustable frame provides means for regulating the size of the piece of bait severed.

16. A device for baiting fishing lines having a plurality of hooks secured thereto at spaced intervals comprising hook-guiding means in combination with line-directing means and bait-severing means and means for affixing a piece of bait to a hook.

DAVID MINOR ANDRIST.

REFERENCES CITED

The following references are of record in the file of this patent:

UNITED STATES PATENTS

| Number | Name | Date |
|---|---|---|
| 711,306 | Good | Oct. 14, 1902 |
| 718,067 | Adams | Jan. 13, 1903 |
| 1,996,681 | Marvoll | Apr. 2, 1935 |
| 2,458,671 | Zirbel | Jan. 11, 1949 |